June 4, 1968 K FRANCK Re. 26,397

STREET LIGHTING LUMINAIRES

Original Filed Jan. 17, 1967 6 Sheets-Sheet 1

INVENTOR
KURT FRANCK
BY John W. Cole
ATTORNEY

June 4, 1968 K. FRANCK Re. 26,397

STREET LIGHTING LUMINAIRES

Original Filed Jan. 17, 1962 6 Sheets-Sheet

INVENTOR
KURT FRANCK
BY John M. Cobb
ATTORNEY

STREET LIGHTING LUMINAIRES

Original Filed Jan. 17, 1962 6 Sheets-Sheet 3

INVENTOR
KURT FRANCK
BY John W. Ale
ATTORNEY

STREET LIGHTING LUMINAIRES

Original Filed Jan. 17, 1962 6 Sheets-Sheet 4

INVENTOR
KURT FRANCK
BY
Moses, Nolte, & Nolte
ATTORNEYS

STREET LIGHTING LUMINAIRES

Original Filed Jan. 17, 1962 6 Sheets-Sheet 5

INVENTOR
KURT FRANCK
BY
Moses, Nolte, & Nolte
ATTORNEYS

INVENTOR
KURT FRANCK
BY
Moses, Nolte, & Nolte
ATTORNEYS

United States Patent Office

Re. 26,397
Reissued June 4, 1968

26,397

STREET LIGHTING LUMINAIRES

Kurt Franck, Newark, Ohio, assignor to Holophane Company, Inc., New York, N.Y., a corporation of Delaware Original No. 3,179,793, dated Apr. 20, 1965, Ser. No. 169,166, Jan. 17, 1962, which is a continuation-in-part of Ser. No. 748,575, July 11, 1958, which in turn is a continuation-in-part of Ser. No. 434,521, June 4, 1954. Application for reissue Apr. 26, 1966, Ser. No. 548,027
9 Claims. (Cl. 240—25)

Matter enclosed in heavy brackets [ ] appears in the original patent but forms no part of this reissue specification; matter printed in italics indicates the additions made by reissue.

*ABSTRACT OF THE DISCLOSURE*

*A street lighting luminaire having reflector and refracting elements which redirect the light in two beams at approximately 75° above the nadir and spreading from the curb line about 45° so as to illuminate the surface of a relatively wide street. Parbolic shielding reflectors in vertical and horizontal section are employed on opposite sides of a light source to intercept light above approximately 65° above the nadir. Above the side of the shielding reflectors is a top reflector which redirects high angled light downwardly.*

The present invention relates to street lighting luminaires and more particularly to such luminates employing horizontal mercury vapor lamps as the light source and adapted for side of street lighting.

The present application is a continuation-in-part of application Serial No. 748,575, filed July 11, 1958, which was itself a continuation-in-part of application Serial No. 434,521, filed June 4, 1954.

The present invention contemplates luminaires having reflectors and refracting means which redirect the output of the source so as to produce typical IES type III distribution in which the light is emitted in two beams at approximately 75° above the nadir and spreading from the curb line about 45° so as to illuminate the surface of a relatively wide street or roadway.

The luminaire employes shielding reflectors on opposite sides of the source adapted to intercept light above approximately 65° above the nadir and reflect it downwardly at the corresponding angle to the nadir, and at the same time direct it approximately 20° away from the curb line. To do this the shielding reflectors are made parabolic in vertical and in horizontal section. The employment of continuously curving side shielding reflectors assures a beam pattern characterized by an absence of sharp changes in intensity and deviation of the rays. Owing to the size of the source there is, of course, considerable spreading of the reflected rays both vertically and horizontally.

Above the side of shielding reflectors is a top reflector which redirects high angled light downwardly. The reflectors are received in a housing which carries the lamp. This housing is elongated and made symmetrical about its longitudinal (across the street) axis and its transverse axis. It has a horizontal bottom opening and supports a refracting bowl which redirects the reflected and direct light falling on it. The bowl has a horizontal upper mounting flange to fit the housing.

In one embodiment of the invention, the refracting bowl has relatively steep sides which are surfaces of revolution of uniform vertical radius about a series of centers all in the same plane so that the upper active portion of the refractor makes the same angle with the vertical at every point along each side. The preferred angle of the tangent at this elevation; i.e., at the flange, is 20°. In horizontal sections the sides of the refractor are circular arcs about suitably selected vertical axes to maintain the oval contour. The broad side portions of the refractor are areas of a sphere, while the ends and corner portions are toroidal. The regions just described thus start at 20° below the horizontal through the centers about which the vertical arcs are generated. They extend down far enough to intercept all the reflected light from the side reflectors. The oval bottom of the refracting bowl is made outwardly convex in all directions, partaking of the shape of an orange slice.

The side portions of the refractor just described are provided with systems of prisms which handle the dominant reflected light to elevate it and laterally redistribute a portion of it for better illumination of remote street areas. The bottom of the refractor receives direct light as well as light from the top reflector. It is provided, according to the present invention, with light splitting prisms which redistribute one portion of this direct light onto a beam pattern which provides a continuation of the beam pattern for direct light passing through the light elevating prisms on the sides of the refractor, and redistributes the other portion over the adjacent street areas. The bottom is also provided with prisms which redirect light onto the street which would otherwise fall beyond the curb line.

In another embodiment of the invention, the refractor is provided with side and end walls which are generated about axes which result in different slopes than those with reference to the refractor just described. Resultingly, different lateral and transverse light distributions can be handled for different applications through the side and end portions of a refractor of the invention. However, in each instance, the bottom of the refractor which receives direct light as well as light from the top of the reflector, may be provided with light splitting prisms for redistribution of a portion of the light into the beam pattern on either side of the refractor and of the remaining portion of the light over adjacent street areas.

With respect to this latter provision of the invention, the light splitting prisms at the bottom portion of a refractor of the invention are prisms which are longitudinally disposed relative to the longer axis of the generally elongated bowl and which provide two surfaces, each of which are disposed to receive light from light source. In accordance with the invention, each light splitting prism is symmetrical on either side of a plane through the apex of each prism and it is the curvature of the bottom of the refractor in the area of the light splitting prisms which is such, relative to the light source, that the acceptance of light from the source by both sides of each prism results.

Other and further objects will appear as the description proceeds.

The accompanying drawings show, for purposes of illustrating the present invention, one embodiment in which the invention may take form, it being understood that the drawings are illustrative of the invention rather than limiting the same.

Figure 3:
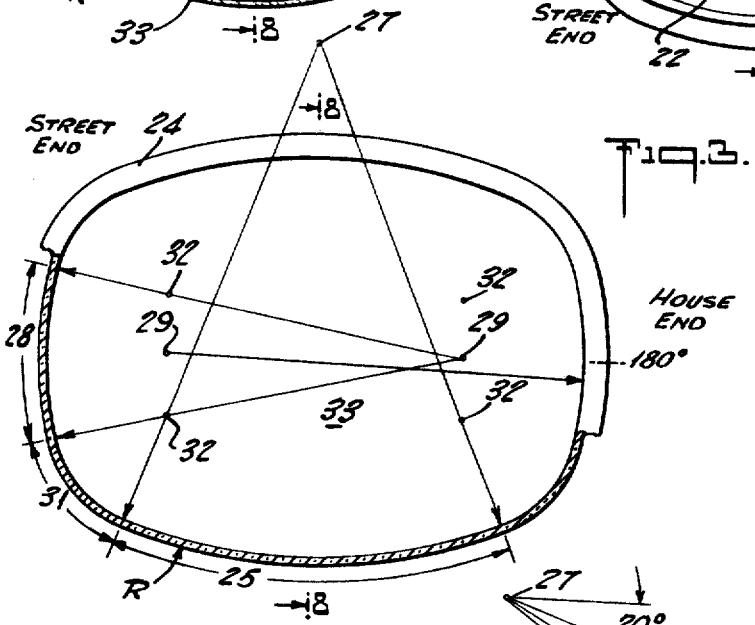
FIGS. 3, 4 and 5 are diagrammatic outline views showing the geometry of the refractor form, FIG. 3 being a top plan view, FIG. 4 a side elevational view, and FIG. 5 an end view.
Figure 4:
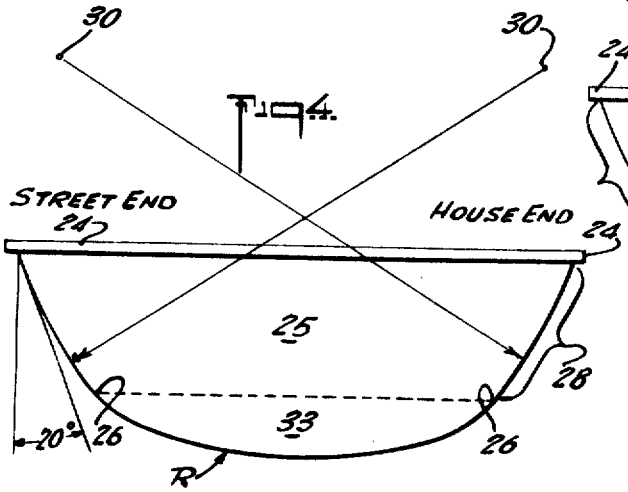
Figure 5:
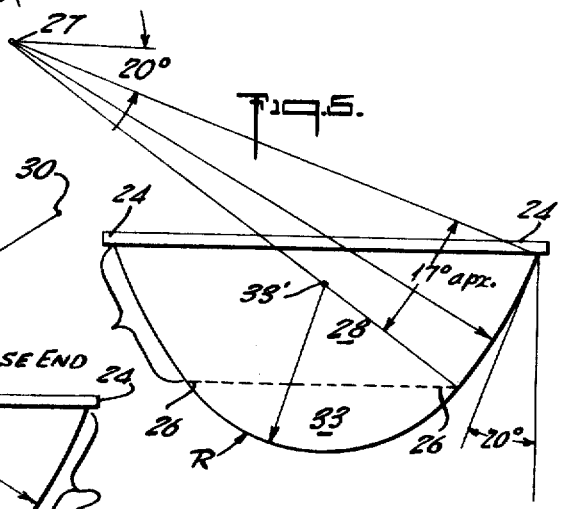
Figure 6:
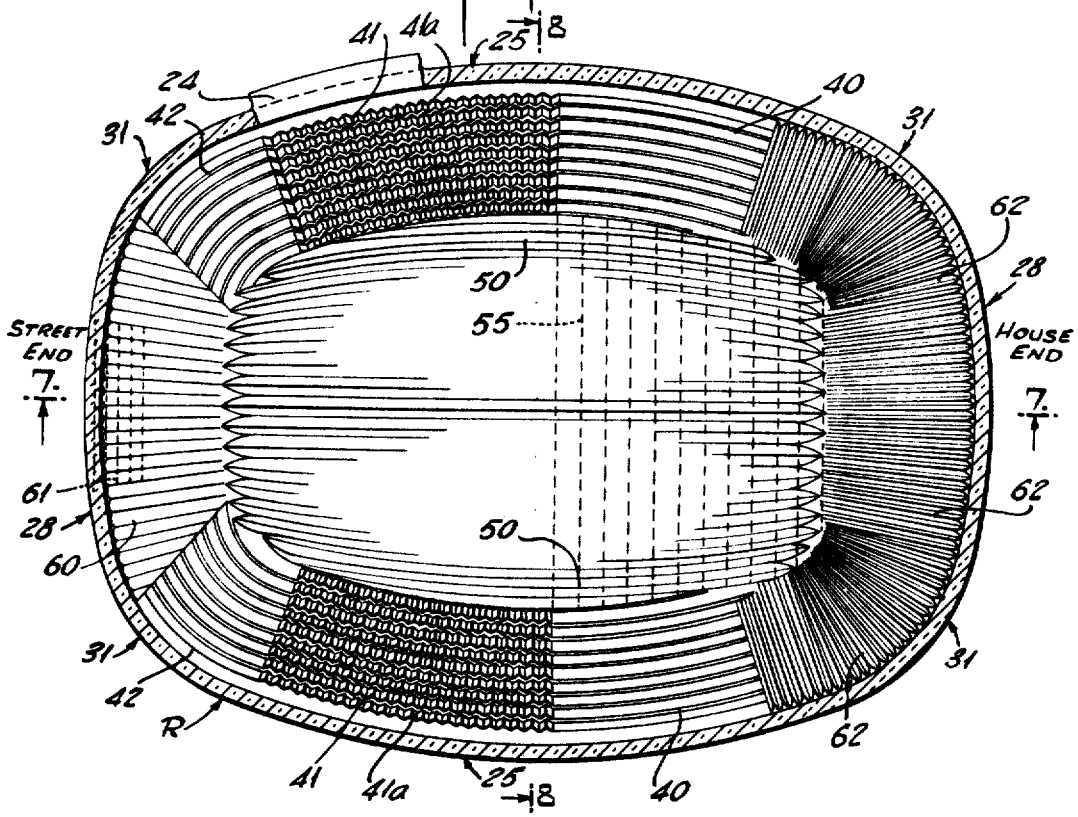
FIG. 6 is a top plan view of the refractor.
Figure 12:
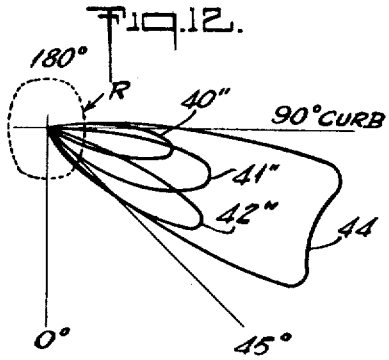
Figure 11:
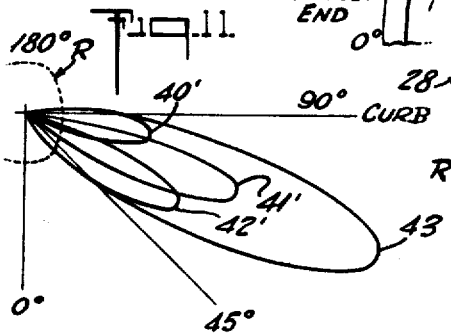
FIG. 11 is a diagram illustrating the photometric light curves from one of the side reflectors for light impinging on different regions of the refractor, and the total lateral output of this reflector.
Figure 13:
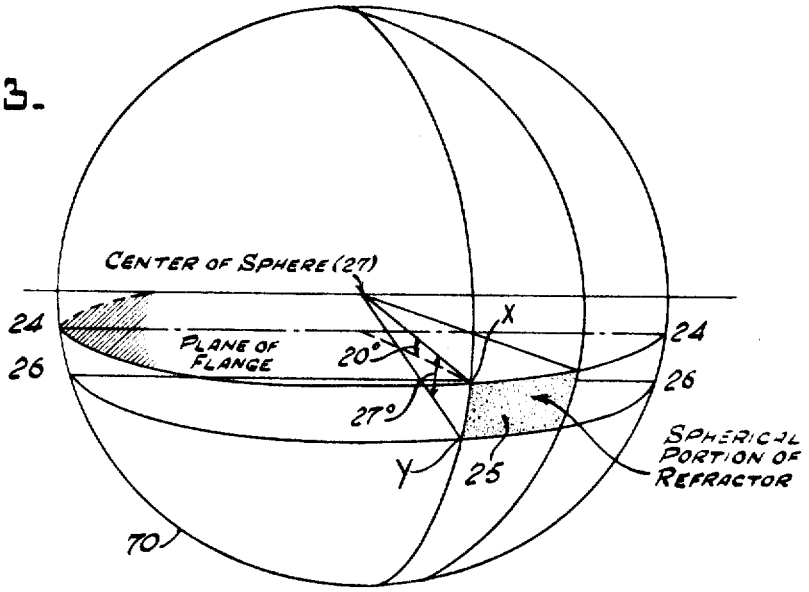
Figure 14:
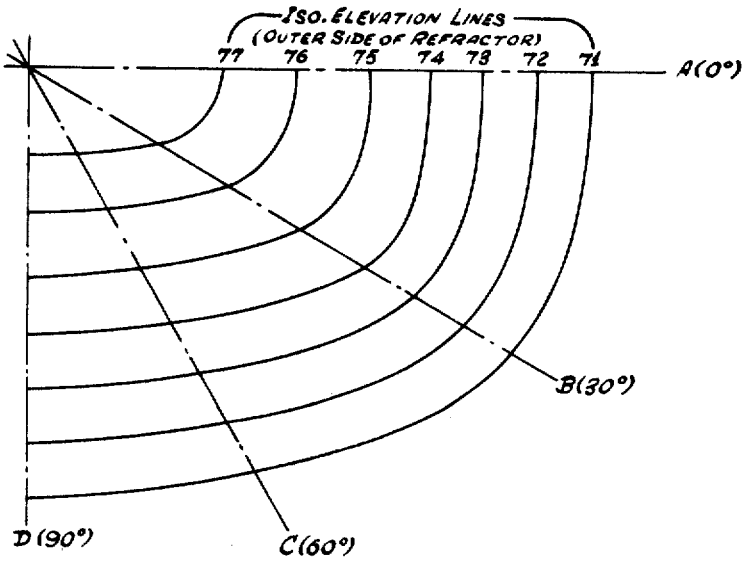
Figure 15:
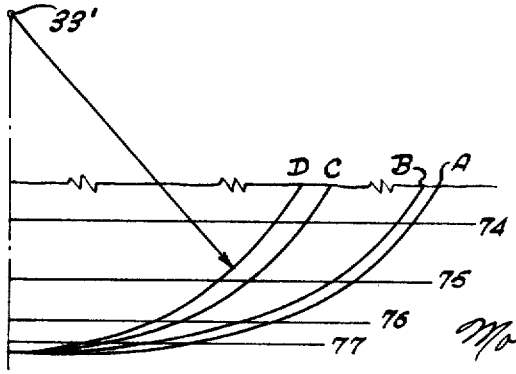
Figure 16:
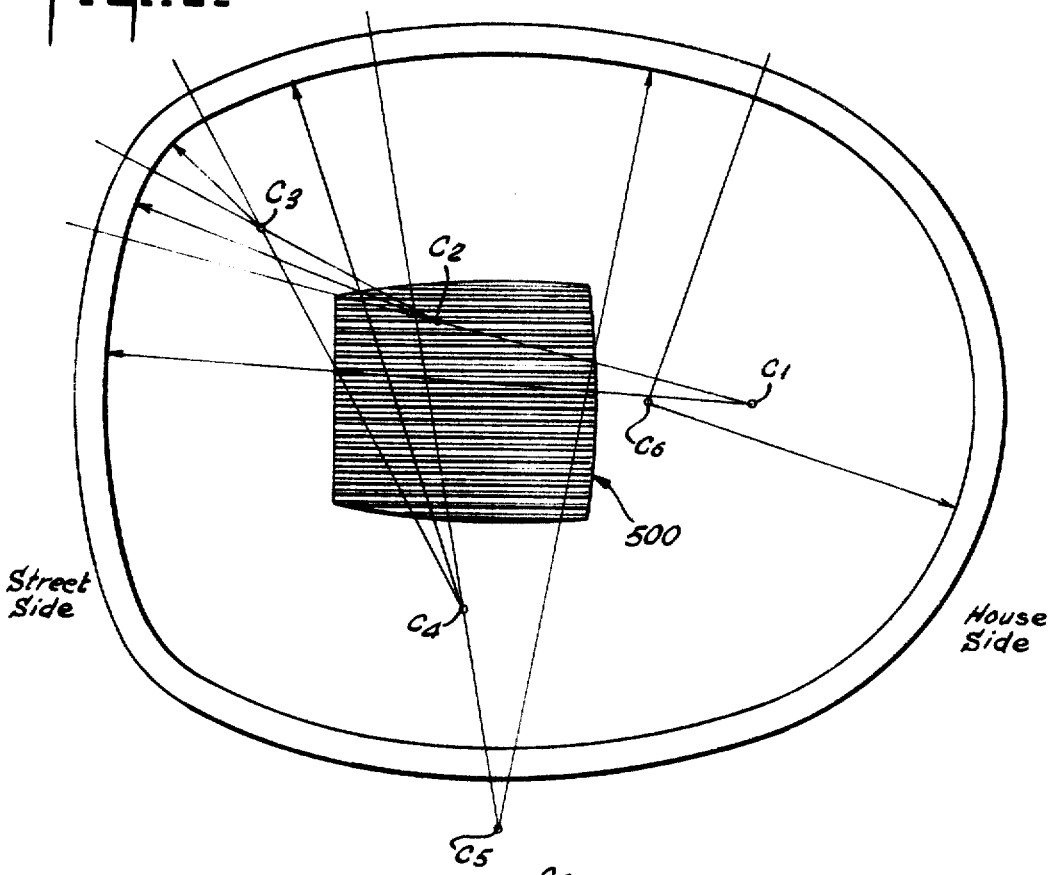
Figure 17:
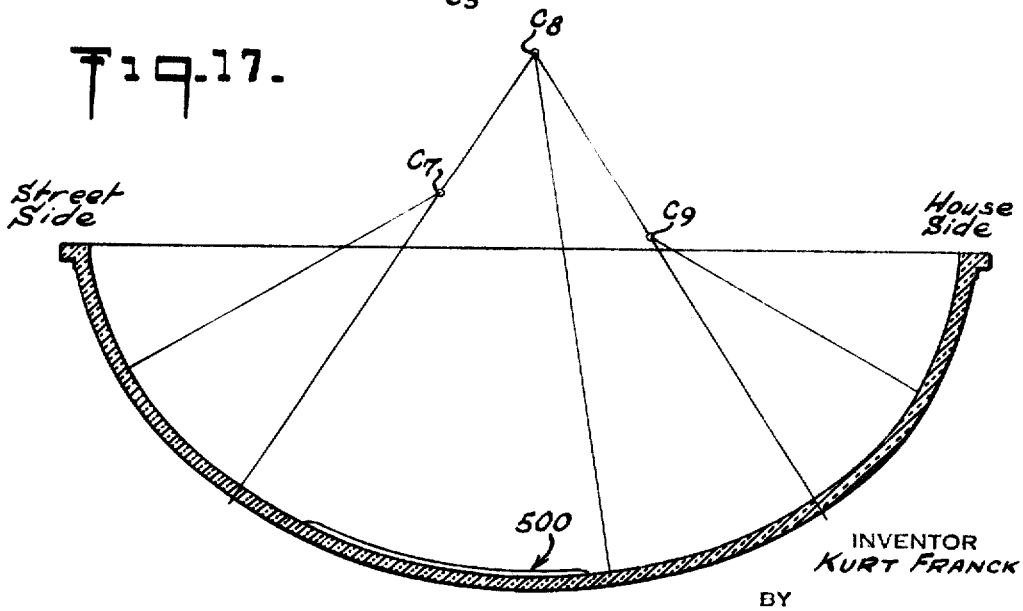
Figure 18:
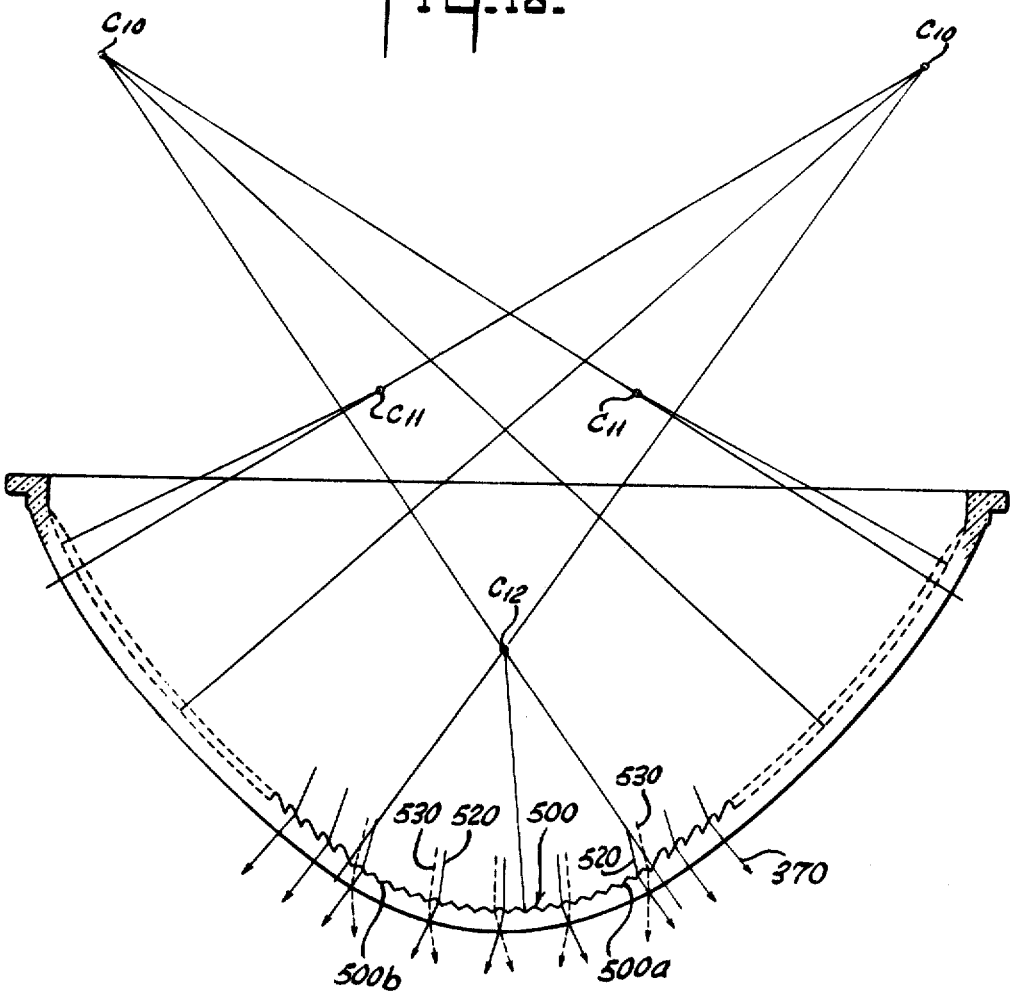

FIG. 12 is a view similar to FIG. 11 illustrating the output of the refractor regions receiving light from the side reflector and the total output of the refractor; and FIGS. 13 to 15 are diagrams illustrating the construction of the refractor; and FIGS. 16, 17 and 18 are views, similar to FIGS. 3, 4 and 5, showing the geometry of another refractor form, FIG. 16 being a top plan view, FIG. 17 a longitudinal sectional view and FIG. 18 a transverse sectional view.

The present luminaire is designed for side of street mounting and to produce IES type III distribution from a horizontal mercury lamp. This distribution typically has its output concentrated at 75° above the nadir and is spread laterally in beams which reach from the 90° curb line to the lines 45° from the curb.

As shown in the drawings the luminaire has a reflector housing 20 with mounting bracket 21. The housing supports a horizontal mercury vapor lamp L, two side reflectors 22, 22 and a top reflector 23. The mounting height of the light source L is above the bottom edge of the reflectors so that the dominant portion of the laterally emitted light both above and below the horizontal is intercepted by the side reflectors. The bottom of the housing is closed by a refracting bowl generally designated by the letter R having a mounting flange 24. The side reflectors act to redirect light onto the refractor into a pattern which approximates the desired pattern and this refractor redistributes the light onto the street and covers and obscures the light source and reflectors.

The prismatic light controlling elements of the refractor R are distributed about the inner and outer surfaces of a refractor form which is symmetrical about both the 0°–180° axis and the 90°–90° axis and has a generally oval shaped horizontal contour.

The broad side portions 25, 25 of the refractor form, from the mounting flange 24 down to the level indicated in FIGS. 4 and 5 by the horizontal line 26, 26 are portions of spheres centered at 27, 27, FIGS. 3 and 5. This center is at such an elevation above the flange that the angle that the tangent to the side makes with the vertical has an optimum value of 20° where the curved side meets the flange. The sides are about 17° wide, as indicated. The two end portions 28, 28 of the refracting form are toroidal surfaces of revolution about vertical axes at 29, 29 and about centers 30, 30 located to provide the same vertical radius of curvature and 20° angle as the side portions 25. The "corner" portions 31, intermediate the side and end portions are toroidal, have the same vertical radius of curvature about centers, not shown, but at the same elevation as the centers 27, and 30, and the horizontal radii of curvature about vertical axes 32.

Below the line 26, 26 the bottom of refractor 33 is outwardly convex in all directions and shaped as shown in the drawing to merge into the sides and end portions. It is circular about center 33', FIG. 5, in the 90°–90° cross section.

FIG. 5 shows the center 33' on the lower portion of the radial line from center 27 to horizontal line 26 and in the center of the refractor form. Center 33' is thus completely determined and the radius to it is such that the arc connects the two side portions in a smooth curve.

FIG. 4 similarly shows that in the longitudinal median plane there is an arc of relatively short radius extending downwardly from the line 26 at each end of the figure. The centers of these arcs must be on the radii of the arcs above 26, else there would be a ridge or a valley. Also, this figure shows that these short arcs are connected by an arc whose maximum depth is determined by the arc struct about center 33'. These conditions define the locations of centers of the long arcs of the bottom.

The precise form of this long arc is not important so long as its center is at the right depth and its ends merge with the end arcs and there are no abrupt changes in surface contour.

The precise form of the transverse arcs between the central arc about 33' and the ends of the bottom section are not important so long as a smooth externally convex contour is achieved. Such contours must, of course, be externally convex in all directions.

FIG. 13 together with FIG. 5 show how the spherical sides 25 of the refractor are formed. Point 27 is the center of the sphere 70, so that the line between point 27 and the circle 24—24 is the radius of the sphere. Also, the line on the right-hand side of FIG. 5, 20° from the vertical, is tangential to the spherical section at the plane 24—24. Since the radius of the sphere is perpendicular to a tangent to the sphere at the point of tangency, the radius must slope upwardly at 20° from the horizontal as shown in FIG. 5. The lines drawn to points X and Y in FIG. 13 are the horizontal projections in planes 24—24 and 26—26 of the radii drawn from point 27. It can be seen from FIG. 13 that the radius from 24—24 to point 27 makes a vertical angle of 20° with the radius drawn to the point X and that it makes an angle of 17° with the radius drawn from point 27 to the circle 26—26. The side 25 is then a spherical section extending between the planes 24—24 and 26—26, its longitudinal extent being sufficient to enable it to join the toroidal corners 31. The bottom 33 is of a shape which is not geometrically describable. FIG. 14 shows the contour lines of the refractor in a series of horizontal planes. The first step in describing the contour is the one shown in FIG. 5 of making the cross section along 8—8 of FIG. 3 smooth and continuous, and as a radius about point 33'. This point 33' is the only point on the center line of the refractor about which a radius can originate and still blend into the sides 25 at line 26—26. The bottom is further defined by FIG. 14 wherein a series of iso-elevation lines 71–77 of a quarter section of the refractor are drawn, which compare with water lines of a boat. Since these iso-elevation lines run smoothly and continuously, the bottom of the refractor is smooth and continuous and does not have any bumps or sharp corners. Templates may then be formed of cross section contours selected at 0°, 30°, 60° and 90°. These contours are shown in FIG. 15 as A, B, C and D. The cross section D, of course, was previously fixed as being a radius with center at point 33', since this point is the only one on the center line of the refractor about which a radius can originate and still blend into the section at line 26—26.

It will thus be seen that the refractor form has surfaces of revolution between the flange and the plane 26, 26 with uniform vertical radius of curvature and uniform minimum vertical angle of its tangent of preferably 20° and maximum vertical angle of about 37°, and that the refractor has a broad, relatively long, bottom portion 33.

Figure 8A:
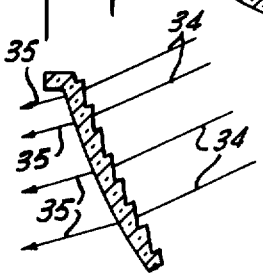
FIG. 8a is a fragmentary sectional enlargement of a portion of the refractor also taken on the line 8—8 of FIG. 6.
Figure 8:
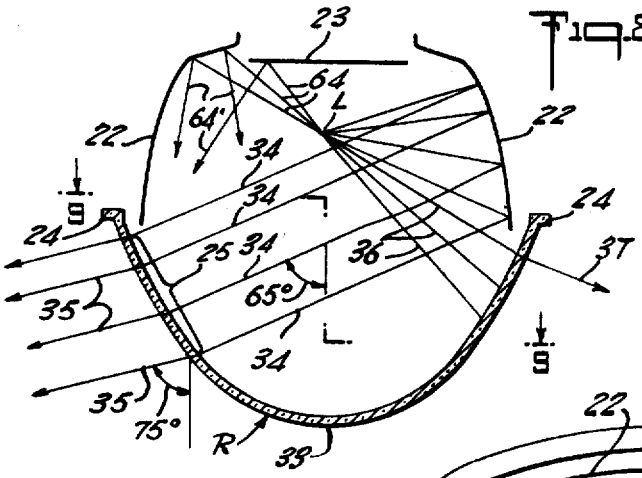
FIG. 8 is a transverse (90°–90°) vertical section on the line 8—8 of FIGS. 1, 2, 6 and 7, showing the vertical redistribution of the light rays.
Figure 9:
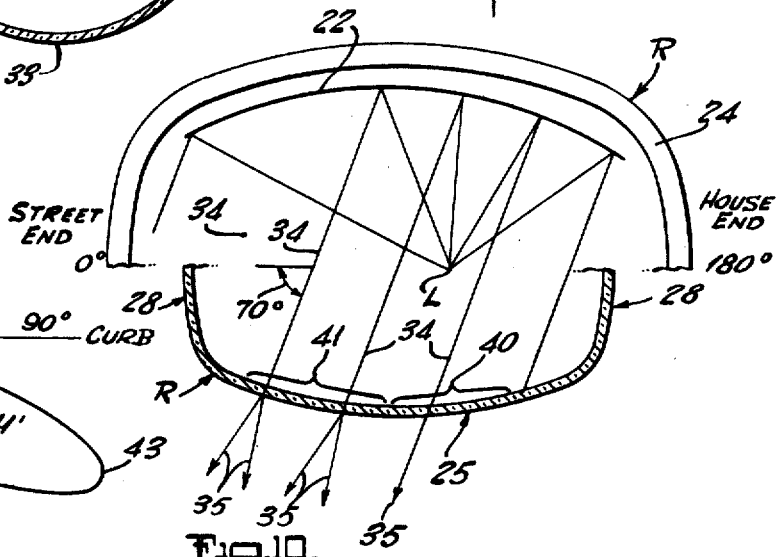
FIG. 9 is a section taken on the broken line 9—9 of FIG. 8, showing the lateral redistribution of the light reflected by the side reflectors and the refractor.

The broad side portions 25 of the refractor and the side reflectors form optical trains which handle the dominant reflected light. As shown in FIGS. 8 and 9, each side reflector 22 is parabolic in vertical and horizontal cross section and, as shown by the lines 34, FIGS. 8, 8a and 9, return the reflected light at 65° to the vertical and at lateral angles of 70° from the 0°–180° line. The light from the side reflectors falls on the broad side portions 25 at angles (65°), too steep for efficient street lighting and with insufficient lateral spread to uniformly light up the street area.

Referring to FIGS. 6 to 10 it will be seen that the side portions 25 of the refractor R are each provided with a tier of light elevating prisms 40, 40 toward the house end which act on light from the house end of the opposite side reflector and elevate it to angles of 75° from nadir, as indicated at 35, without significant lateral deviation, and with a tier of light elevating prisms 41, 41 with similar light elevating power but provided with vertical prismatic ribs 41a which split the rays (as at 35 in the bracketed area 41 in FIG. 9) and impart controlled lateral spread to them.

The corner portions of the refractor at the street end are provided with a tier of light elevating prisms 42, similar to those in tier 40.

Figure 10:
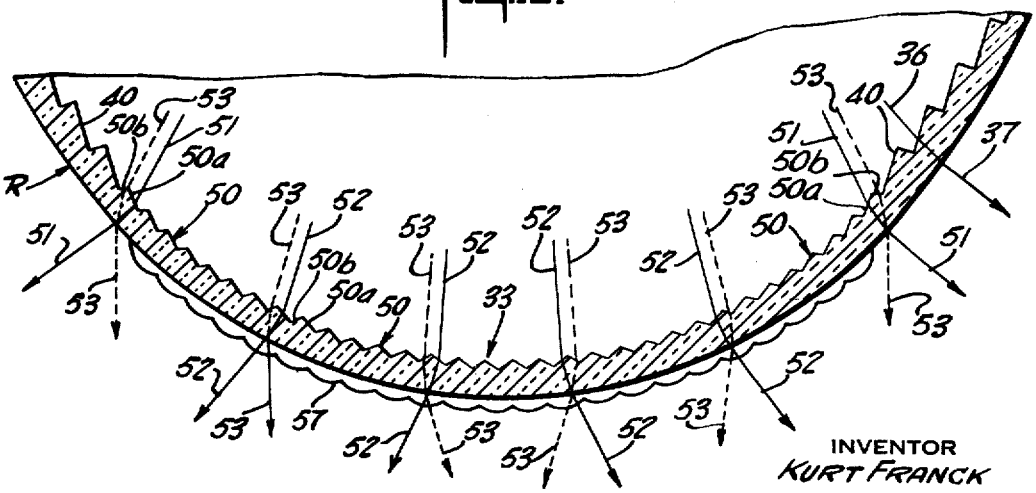
FIG. 10 is an enlarged vertical, transverse sectional view on the line 8—8 of FIG. 7 through the bottom of the refractor, showing the redistribution of the direct light.

The prisms 40, 41 and 42 receive direct light through a relatively wide vertical angle as indicated by the rays 36, FIGS. 8 and 10 and elevate these rays as indicated at 37 into angles of 75° downward so that they fall on more remote street areas and provide a corresponding brightness pattern to the sides of the refractor at corresponding angles of sight.

The prism system 40, 41, 42 thus not only change the vertical angle of the reflected light, and such direct light falls on them, but they also rearrange the lateral distribution of the reflected and direct light. This is illustrated in FIGS. 11 and 12. In FIG. 11, the light output (at the 65° vertical angle) impinging on the prismatic regions 40, 41 and 42 is illustrated by curves marked 40′, 41′ and 42′, respectively. A small, but unavoidable portion of the light in curve 40′ spills beyond the curb line, while another small, unavoidable portion of the light of curve 42′ spills beyond the 45° line. The summation of curves 40′, 41′ and 42′ at the 75° vertical angle is shown at 43. This is a long pointed beam.

When the light from the side reflectors is passed through the elevating prisms 40, 41 and 42, the lateral distribution is altered by the ribs 41a on prisms 41. Curve 41 is replaced by a broader, shorter curve 41″, while curves 40″ and 42″ remain substantially as before. As a consequence the long narrow pointed curve 43 is replaced by a wider, more flat crested pattern 44, FIG. 12. Without splitting more light beyond the curve or on the 45° line, the light has been spread toward these 90° and 45° lines.

The bottom 33 of the refractor receives direct light from the lamp L and reflected light from the top reflector 23. The upper surface of the refractor bottom 33 is provided with light splitting prismatic ribs 50 parallel with the 0°–180° line, FIGS. 6, 7 and 10. These ribs are symmetrically placed with respect to the longitudinal median plane 1—1 of the refractor and each rib has a surface 50a near the median plane disposed at an angle to spread the light away from the nadir and a remote surface 50b disposed at an angle to lower the light toward the nadir. The *curvature of the bottom and the* refracting powers of the surfaces 50a of the more lateral ribs 50 are such that the direct light is raised nearly to the same vertical angle of the lower refracted direct light rays 37. This is indicated in FIG. 10 by the full line ray paths 51—51. The other prism surfaces 50b are disposed to provide nearly uniform refracting power so that the direct light is continuously scanned down to the nadir. The other elevated rays are indicated in full lines 52, 52. The rays falling on the more remote surfaces 50b of the ribs 50 are disposed as indicated by the dotted line ray paths 53. These depressed rays effect a uniform illumination of the street surface below the luminaire and at the same time there is no break in the direct light pattern.

In the refracted beam the lower direct ray 36 is elevated about 20°, and all the surfaces 50a are preferably placed to give a uniform 20° deviation. The amount of deviation of the intermediate prisms may be varied, if desired.

It is noted that a fairly complex light distribution is achieved by a very simple prismatic arrangement of the light splitting prisms 50. Their disposition relative to the light source is such that each side of the prisim receives light from the light source. As they are disposed on the bottom of the refractor which is formed along a circular circumference of revolution about a longitudinal axis 33′, they receive light from the light source at very slightly varying angles that the deviation will be substantially uniform along each point transversely spaced from the next throughout a width of the bottom portion. Furthermore, this complex distribution of light is achieved by prisms which are symmetrical on either side of planes extending through their axes. This symmetry is shown in the embodiment illustrated in FIG. 10 only in the central portions of the refractor bottom. By shaping the bottom more nearly in conformity with that shown in FIG. 18, this symmetry can be carried out throughout the bottom portion from side to side.

Figure 7:
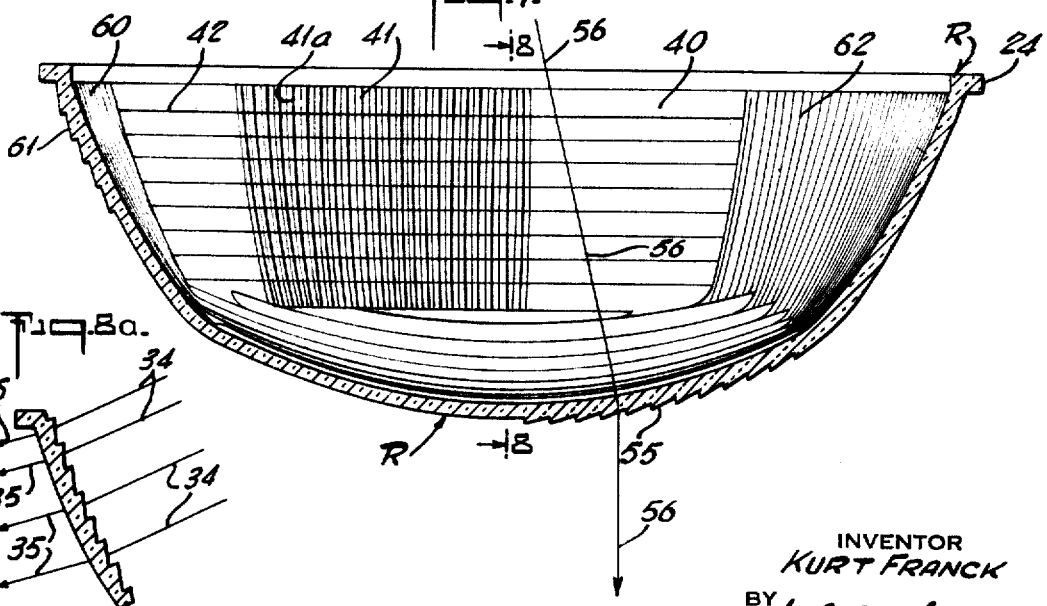
FIG. 7 is a longitudinal sectional view of the refractor taken on the line 7—7 of FIG. 6.

The lower surface of the house end of the refractor bottom 33 is provided with a system of parallel prisms 55 which deviate the light falling thereon away from the curb line and across the street, as indicated by rays 56 in FIG. 7. These rays are distributed lengthwise of the street by the ribs 50 and by supplemental external flutes 57 (FIG 10) placed on the surfaces of the prisms 55.

The street end of the refractor is provided with internal vertical diffusing flutes 60 and with external light depressing prisms 61. These also act to diminish high angles, across the street, stray light and to light up the end of the refractor. The house end of the refractor has vertical prisms 62 which deviate light falling thereon toward the street area to reduce illumination outside the curb line.

Figure 1:
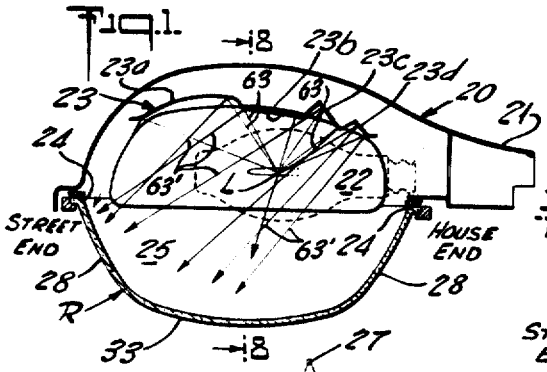
FIG. 1 is a 0°–180°, across the street, vertical section through the luminaire at reduced scale and taken on the line 1—1 of FIG. 2.
Figure 2:
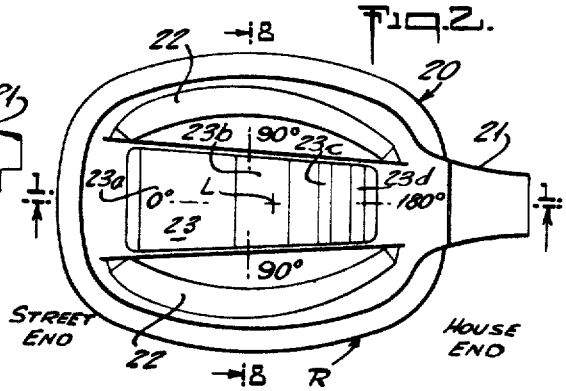
FIG. 2 is an inverted plan view showing the hood and reflectors of the luminaire, also at reduced scale.

The supplemental reflector 23 disposed above the side reflectors 22, as shown in FIGS. 1, 2 and 8, has in the 0°–180° sections a series of straight and curved reflecting portions 23 a, b, c, d, which are horizontal in the 90°–90° direction. These act to redistribute the high angle direct light downwardly onto the refractor, as indicated by rays 63, 63′ and 64, 64′.

The entire outer surface of the refractor, except the prisms 55 and 61, is preferably provided with a pattern of light diffusing elements which obscure the interior of the luminaire without impairing the dominant light outputs.

For illustrative purposes, the principal dimensions of one embodiment of the refractor may be given. The overall length and width of the mouth were about 17.3 and 13.1 inches and the internal length and width of the mouth were about 16.2 and 12.2 inches. The internal depth, below the flange, was about 6.25 inches. The radii to points 27 and 30 were 16.5 inches, the maximum radius to vertical axes 29 was 12⅜ inches, the maximum radius to axes 32 was 4⅜ inches, and to point 33 it was 5 inches. The radii of the corner portions 31 in vertical planes was equal to the vertical radii of the sides and ends 25 and 28 and had centers in the same horizontal plane as points 27 and 30.

FIG. 16, which is similar to FIG. 3 shows that the horizontal contour of the sides of a refractor constructed in accordance with the invention, is developed by the swing of six different radii about centers C1, C2, C3 and C4 at the street end of the refractor and about centers C5 at the middle of the refractor and C6 at the house end of the refractor.

FIG. 17 is similar to the showing of the FIG. 4 refractor, but shows the longitudinal contour of this refractor of the invention as being completely defined by the swing of three different radii around centers C7, C8 and C9. As previously noted with reference to FIG. 4, the bottom contour of that refractor is not definable by any system of radii.

FIG. 18, which is a transverse section similar to the showing of FIG. 5, shows the transverse contour of this refractor of the invention as being described by the swing of three different radii, C10, C11 and C12, $C10_1$, $C11_1$ and $C12_1$, on either side of the center vertical plane through the longitudinal axis of the refractor.

Although the lateral, toward-street and toward-house light distribution will be different from that of a refractor constructed in accordance with the structures shown in the previous figures, the construction of the longitudinally extending prisms 500 on the light incident side of the bottom portion of the refractor bowl is exactly the sam in transverse section as that of the previously described embodiment of the invention. That is, the contouring at the bottom portion (described by a radius swing about center C12) and the disposition of the prisms relative to the light source (not shown in FIGS. 16–18) is such that the light splitting prisms 500, though symmetrical on either side of a center plane through the apex of each prism, perform the complex light distribution as indicated by arrows 520 and 530. Each surface of each prism 500 receives the light from the source and sends this light into downward directions relative to the nadir on either side of the refractor in varying vertical angles from the center of the most lateral prism 500. The refracting powers of the surfaces 500a (facing the median plane on either side of the refractor) of the more lateral ribs 500 are such that a direct light is raised nearly to the same vertical angle of the lowermost refracted direct light rays 370 from the side portions of the refractor. The prism surfaces 500a nearer the longitudinal centerline are disposed to provide nearly uniform refracting power so that the direct light is continuously scanned down to nadir. The rays falling on the more remote surfaces 500b, relative to the median centerline are directed as indicated by the dotted line ray path 530. These rays are substantially uniformly depressed to effect a uniform illumination of the street surface immediately below the luminaire.

It is seen, therefore, that the light splitting prisms 50, 500 shown in the figures can be utilized in differently formed refractor bowls to effect a uniform spread of light on either side of nadir in the bottom portion of the refractor. It is the curvature of the bowl at this bottom portion, plus the disposition of this portion of the bowl from the light source which permits the symmetry of the prisms on either side of their apices and their resulting uniform light distribution.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

I claim:

1. An elongated street lighting refractor for disposition beneath a light source comprising sides externally convex in transverse, vertical and in horizontal planes and a curved bottom connecting said sides and being externally convex in transverse and in longitudinal vertical planes, horizontally disposed light elevating prism means formed along the length of said sides, said elevating prisms means being of uniform refracting power relative to rays incident thereon of predetermined vertical angles to the nadir and relative to direct incident light emanating from the light source for elevating said rays and said light into a beam of predetermined higher vertical angles, prismatic light splitting ribs formed on said bottom portion and extending substantially parallel to the longitudinally vertical median plane of the refractor, said ribs occupying the region between the prisms on the side portions and the nadir, each said prismatic light splitting rib having a first and a second refracting face, said faces converging toward the light source and being symmetrical on either side of a plane through the apex thereof, said first refracting faces of said ribs facing the longitudinal vertical median plane of said refractor and said second refracting faces of said ribs facing away from the longitudinal vertical median plane of said refractor, the curvature of said bottom *and the refracting power of said refracting faces of said light splitting ribs* being such that said first faces [vary in refractive power from one to the next from the longitudinal vertical median plane to said sides and receive] *constitute means for receiving* direct light from the light source and [raise] *for raising* the same toward [a vertical angle approximating the predetermined higher] *the* vertical angle of [the beam] *said light* elevated by said prism means on said sides and in paths below the beam, and said second faces [are of substantially constant refractive power from one to the next and receive] *constitute means for receiving* direct light from the light source and [lower] *for lowering* the same at varying angles toward nadir from said sides to the longitudinal center of said bottom portion, the uppermost said second faces adjacent said sides deviating light from the light source *nearly* vertically downward whereby the rays of direct light from the source are spread by said light spreading ribs substantially uniformly between the predetermined vertical angles on either side of said refractor.

2. An elongated street lighting luminaire for side of street mounting comprising a light source of substantial size, reflector means including portions on opposite sides of the source of parabolic vertical profile and reflecting light downwardly across the longitudinal vertical axis of the luminaire at uniform angles to the nadir and of parabolic horizontal profile tilted away from the "house" end of the luminaire end toward the "street" end and reflecting the light into parallel, downward directions oblique to the curb line, and an elongated refracting bowl below the reflector portions, the bowl having side portions receiving the reflected light, horizontally disposed light elevating prism means formed on said side portions and lifting the reflected light into vertical beam angles, vertically disposed light splitting means also formed on said side portions and spreading the reflected light horizontally into predetermined diverging lateral angles and confining the spread light within the horizontal angles of spread, oblique to the curb line, produced by the reflector on opposite sides of said light source, said refractor having a bottom portion, two-sided light splitting ribs extending longitudinally on said bottom portion and between the lowermost edges of said side portions, the curvature of said bottom portion and the disposition of the sides of said light splitting ribs relative to said light source being such that one side of each rib *comprises means for refractively elevating* [varies in refracting power from one to the next and elevates] the direct light from the light source incident thereon substantially into the vertical beam angles of the reflected light lifted by the horizontal prisms on said side portions but in paths below the lifted reflected light, and *the curvature of said bottom portion and* the other side of each rib *comprises means for refracting* [is of substantially uniform refracting power from one to the next and refracts] the direct light from the source incident thereon into varyingly lower substantially downward angles, whereby the rays of direct light from the source are spread by said ribs substantially uniformly between the lifted reflected light emitted from the side portions of said bowl.

3. The elongated street lighting luminaire as claimed in claim 2, wherein said ribs are formed on the inner surface of said bottom portion and the "house" end of the bottom portion of the refractor has prism means extending on the outer surface thereof opposite said ribs and parallel to the curb line for deviating light away from the house end.

4. A light transmitting member for disposition below a light source and comprising a bowl having a horizontal oval-shaped upper opening and being symmetrical about its longitudinal and transverse axes, said bowl having spherical outwardly convex side portions extending downwardly and inwardly from the edges of said upper opening through substantially a 17° arc, outwardly convex toroidal corner portions extending downwardly and inwardly from the edges of said upper opening through substantially at 17° arc outwardly convex toroidal end portions extending downwardly and inwardly from the edges of said upper opening through [substantinally] *substantially* a 17° arc, each said side, corner and end portion having the same curvature in vertical planes, said spherical side portion curvatures being generated about a pair of centers transversely spaced above and outwardly on each side of said upper opening, said toroidal corner portion curvatures being generated about centers above said upper opening, said toroidal end portion curvatures being generated about a pair of centers longitudinally spaced above said upper opening, all of said centers being disposed at a uniform height above the plane of said upper opening, a bottom portion extending integrally from said side, corner and end portions, said bottom portion being externally convex and smoothly curved longitudinally and transversely, horizontally disposed light elevating prisms formed on said side portions and extending toward said end portions on either side of a transverse median plane through said refractor, horizontally disposed light elevating prisms formed on said corner portions at one end of said bowl, said horizontally disposed light elevating prisms of said sides and corners being of uniform vertical refracting power and arranged for elevating downwardly oblique parallel rays extending toward said prisms of said sides and said prisms of said corners to about 70° to the vertical, and light splitting vertically disposed prisms formed on said horizontally disposed prisms on said side portions along one-half of the area of said side portions adjacent said corners at said one end of said bowl, said light splitting vertically disposed prisms spreading light incident thereon into predetermined laterally diverging angles, further light splitting prisms formed on said bottom portion and extending substantially parallel to the longitudinal axis of said bowl, each said further light splitting prism of said bottom portion having a first and second horizontally extending refracting face, said refracting faces of each said prism converging toward the light source and being symmetrical on either side of a plane passing through the apex thereof, said first refracting faces of said further light splitting prisms facing toward the longitudinal vertical median plane of said bowl, said curvature of said bottom portion being such that said first refracting faces vary in refractive power from one to the next from the longitudinal median plane of the bowl to said side portions and deviate corresponding portions of direct light incident thereon substantially to the same vertical angle as the lowermost of said horizontally disposed light elevating prisms on said side portions, said second refracting faces of said further light splitting prisms facing away from the longitudinal vertical median plane of said bowl, said curvature of said bottom portion being such that said second refracting faces are of substantially constant refractive power from one to the next and lower the corresponding portions of direct light incident thereon at varyingly larger vertical angles toward nadir from said side portions to the center of said bottom portion and the outermost of said second refracting faces adjacent said side portions direct light vertically downwardly whereby the rays of direct light from the source are spread by said further light splitting prisms on said bottom portion substantially uniformly between approximately 70 degrees on either side of nadir.

5. The light transmitting member of claim 4 in which said prisms on said corner, side and bottom portions are formed on the inner surfaces thereof.

6. The light transmitting member of claim 5 wherein said further light splitting prisms are formed on the inner surface of said bottom portion; transversely disposed prisms are formed on said bottom portion opposite said further light splitting prisms at the outer, lower surface thereof and at one end thereof, said prisms on the outer surface of said bottom portion having apices pointed downwardly and toward the other end of said bottom portion and being arranged to deviate light directed downwardly on said bottom portion away from said one end of said bottom portion.

7. A bowl-shaped refractor for disposition beneath a light source and a reflector disposed over the light source, said refractor comprising side portions and a *curved* bottom portion extending therebetween, each said side portion having horizontal prisms extending from one end thereof to the other end, vertical prisms superimposed on said horizontal prisms through substantially one half the length of each side portion on one end thereof, said bottom portion being formed with longitudinally extending prisms occupying the region between said side portions, each of said longitudinally extending prisms including two converging sides symmetrical on either side of a plane through the apex thereof, *the curvature of said bottom portion and* the sides of said longitudinal prisms facing away from the longitudinal center line of the refractor being *such as to constitute said sides as being* of substantially constant refractive power from one to the next and *the curvature of said bottom portion and* the sides of the longitudinal prisms facing toward the longitudinal center line of the refractor *being such as to constitute said second named sides as being substantially* varying in refractive power from one to the next from the longitudinal center line to the side portions of the refractor, said horizontal prisms consisting of means for deviating light from the reflector and light source downwardly into predetermined vertical angles on either side of nadir, said vertical prisms consisting of means for splitting light incident thereon from said reflector into laterally diverging predetermined oblique angles relative to a transverse plane through said refractor, said longitudinal prisms consisting of means for deviating light from the light source incident on the sides of said longitudinal prisms facing away from the longitudinal center line of the refractor into vertically downward directions, and toward nadir, and for deviating light from the light source incident on the sides of said longitudinal prisms facing toward the longitudinal center line of the refractor into vertical angles away from nadir substantially the same as the predetermined vertical angles of the light emanating from said sides, the total effect of said longitudinally extending prisms being to substantially uniformly distribute the rays of direct light from the source between the predetermined vertical angles of light emanating from said sides.

8. A bowl-shaped refractor for disposition beneath a light source, said refractor comprising sides for directing light incident thereon into beams at vertical angles on either side of a nadir, a curved bottom portion extending between the sides, said bottom portion including splitting prisms arranged in substantially parallel relation relative to one another, each of said prisms having at least two converging sides, the curvature of said bottom portion and the disposition of said converging sides being such that when disposed beneath the light source, one of said converging sides of each said prism faces toward the longitudinal center line of said refractor and [varies in refracting power from one to the next,] the other of said converging sides of each said prism faces away from the longitudinal center line of said refractor [and is of substantially constant refracting power from one to the next,] , *the refracting powers of said sides of said light splitting prisms being such that* [said sides of each prism] *they respectively* [comprising] *comprise* means for receiving light from the light source and *for raising the same toward the vertical angles of the light directed by said sides and for lowering the same at varying angles toward nadir at lower angles than the angles of the light*

*directed by said sides, the distribution of light from said converging sides being such that they constitute means* for directing the [same] *incident light* in crossing paths toward and away from nadir below the beams and uniformly illuminating the area directly below said refractor between the beams.

9. A bowl-shaped refractor for disposition beneath a light source and a reflector disposed over the light source and for controlling lateral beams generated from said light source and reflector for illuminating predetermined areas upon a street between the curb and outwardly thereof, said refractor comprising vertically oriented side portions extending from the house end of the refractor to the street end and disposed for receiving the lateral beams from the light source and the reflector, each said side portion having horizontal prisms extending from said house end toward said street end of said refractor on the inner surfaces thereof and substantially covering the area between the tops and bottoms of said sides, said horizontal prisms being vertically contiguous and each comprising vertically oriented surface means extending between said house and said street ends of said refractor and disposed by the shape of said refractor sides for receiving light from the reflector and light source and for deviating the same upwardly into predetermined vertical angles on either side of nadir and into predetermined lateral angles of spread between the curb and outwardly thereof, vertical prisms superimposed in side by side contiguous relation on said vertically oriented surface means of said horizontal prisms and covering a substantial portion of said sides toward said street ends, each of said vertical prisms consisting of a pair of active surfaces converging inwardly of said sides and comprising means for receiving light from the reflector and light source and for splitting the same into diverging predetermined oblique angles relative to a transverse plane through said refractor within said predetermined angles of spread between the curb and outwardly thereof, whereby the reflected and refracted beam is broadened within said predetermined spread between the curb and outwardly thereof.

References Cited

The following references, cited by the Examiner, are of record in the patented file of this patent or the original patent.

UNITED STATES PATENTS

| | | | |
|---|---|---|---|
| 804,254 | 11/1905 | Mygatt. | |
| 2,307,247 | 1/1943 | Tuck et al. | 240—25 |
| 2,486,558 | 11/1949 | Franck. | |
| 2,493,087 | 1/1950 | Rolph | 240—25 |
| 2,721,931 | 11/1955 | Franck | 240—106 |
| 2,814,723 | 11/1957 | Franck et al. | 240—106 |

FOREIGN PATENTS

| | | |
|---|---|---|
| 566,189 | 12/1944 | Great Britain. |
| 619,084 | 3/1949 | Great Britain. |
| 667,085 | 2/1952 | Great Britain. |

OTHER REFERENCES

Theory and Design of Illuminating Engineering Equipment, by Jolly Waldram and Wilson. John Wally and Sons, 1931. Chapter XXIV, pages 297–317.

NORTON ANSHER, *Primary Examiner.*

JOHN M. HORAN, *Examiner.*

R. M. SHEER, *Assistant Examiner.*

UNITED STATES PATENT OFFICE

CERTIFICATE OF CORRECTION

Reissue No. 26,397

June 4, 1968

Kurt Franck

It is hereby certified that error appears in the above numbered patent requiring correction and that the said Letters Patent should read as corrected below.

Column 8, line 34, for "end", second occurrence, read -- and --; column 10, line 57, for "splitting" read -- light splitting --.

Signed and sealed this 25th day of February 1969.

(SEAL)
Attest:

Edward M. Fletcher, Jr.
Attesting Officer

EDWARD J. BRENNER
Commissioner of Patents